Feb. 7, 1961  E. M. S. McWHIRTER  2,970,757
DOCUMENT CARRIER FOR MECHANIZED PROCESSING
Filed March 24, 1954  2 Sheets-Sheet 1

INVENTOR
E. M. S. McWHIRTER
BY
ATTORNEY

Feb. 7, 1961  E. M. S. McWHIRTER  2,970,757
DOCUMENT CARRIER FOR MECHANIZED PROCESSING
Filed March 24, 1954  2 Sheets-Sheet 2

INVENTOR
E. M. S. McWHIRTER
BY
Robert Hardey Jr.
ATTORNEY

United States Patent Office 2,970,757
Patented Feb. 7, 1961

2,970,757

DOCUMENT CARRIER FOR MECHANIZED PROCESSING

Eric Malcolm Swift McWhirter, Mount Vernon, N.Y., assignor to International Standard Electric Corporation, New York, N.Y., a corporation of Delaware Filed Mar. 24, 1954, Ser. No. 418,394

3 Claims. (Cl. 235—61.12)

This invention relates to the mechanized sorting, transporting and processing of documents and especially to a carrier or jacket with which the document is associated while it is being sorted, transported, or processed, and which will contain separate control data for controlling the various steps or procedures through which the documents must pass.

In the processes of commerce and industry, the transference of information from a number of separate documents to another group of documents commonly occurs. Such transference is the basic clerical process of bookkeeping, stock record maintenance, order handling, and production of invoices, listings, and statements, and constitutes in any business a repetitive process conducted many times daily. It comprises descriptions of items by code or word, value of items, quantities of items by numerical count, weight, length, or volume of items, and often involves association in some other order when transference from one document to another occurs.

Such repetitive clerical processes occur within a business organization and frequently originate or conclude with documents passing from the business organization to its customers or members of the public or even to its employees.

Therefore, to mechanize these repetitive clerical processes, having as their originating or concluding document, or both, a piece of paper carrying the necessary information, which must be capable of interpretation by a person outside the business organization concerned, it is necessary to have documents on which the information can be read either by machines or by human beings. In many cases such pieces of paper constitute a legal instrument or have a legal significance, such that the information on them must be capable of interpretation by normal human reading and knowledge, without the necessity of introducing a machine for this purpose.

This requirement is in conflict with the requirements of the types of machines which exist today which are capable of reading and interpreting information from paper or documents. Whereas human knowledge commonly is trained to read characters and figures typed in well-established characters, most mechanized reading is conducted from conformations of punched or semi-punched holes, from magnetic spots in a magnetic medium, from conformations of embossed spots, from painted or inked marks in conformations of lines or spots in one or more colors, or some similar expression of a coding system which can be sensed by one or another of the well known methods, such as electrical contacts or mechanical fingers or photoelectric response or magnetic response.

Machines exist which will translate from the mechanical encoding and write or print in the arabic or other "human" type characters, but few, if any, exist which will translate in the other direction without human intervention. Even if such machines did exist, the fact would still remain that in many cases of business or industrial processes, the originating document must be conducted through the processes and be retained for legal or other purposes either by the originator or in some known record file. Such documents also vary considerably in size and format, even when required for the same purpose. Checks drawn on banks for the normal exchange of debits and credits are a well known example of such documents in which little if any standardization has been established.

Methods have been introduced by which the one document can be read by both humans and machines. One well known example is the punched card which permits machine encoding to be performed in a prearranged array of information and in which areas of the card not subject to the punchings can be used for the typewritten "inscription" of the same or related information.

The object of the present invention is to provide a document carrier or jacket by means of which any group of documents of reasonably similar dimensions, each with its individual carrier or jacket, can be arranged for processing through their necessary repetitive clerical operation by automatic methods without imposing restriction as to size and format on the document and without marking or stencilling or punching holes in the document itself.

Another object of the invention is to provide a document carrier or jacket to which a document may be temporarily secured and which will provide indicia, such as encoded information, on another part of the carrier which will control the sorting, transportation, and the processing of the document.

Another object of the invention is to provide a document carrier or jacket which is simple in construction, into which the documents may be easily inserted, and which may be readily fed through various types of machines for reading off the information contained thereon.

The above-mentioned and other features and objects of this invention and the manner of attaining them will become more apparent and the invention itself will be best understood by reference to the following description of an embodiment of the invention taken in conjunction with the accompanying drawings, in which.

Broadly the invention comprises a carrier or jacket for random-size documents to permit mechanized sorting, transporting, and processing of such documents, the carrier having two portions, a document-receiving portion and a portion spaced therefrom and adapted to receive indicia corresponding to information contained in said documents for controlling the sorting, transporting, and processing thereof, and means for temporarily securing the document to the document-receiving portion of the carrier.

Figure 1:
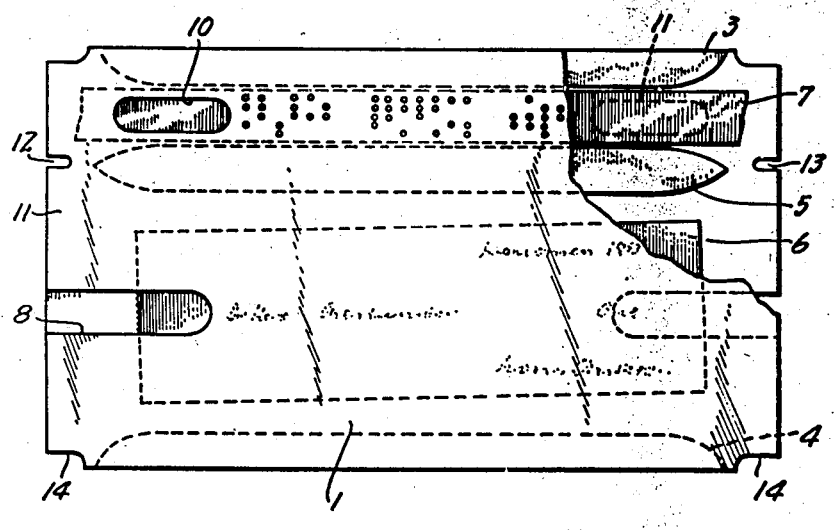
Fig. 1 is a front view of one embodiment of a document carrier.

Referring now more specifically to the drawings, Figure 1 shows one embodiment of the carrier which comprises two flat, rectangular plates 1 and 2 of transparent material, such as plastic, secured together in parallel relation and slightly spaced apart to permit a paper to be inserted between them. Elongated spacers 3 and 4 may be provided at the outer long edges of the plates and an elongated spacer 5 may be provided between the plates a short distance away from the spacer 3 and parallel to it. The spacers may be cemented to the plates so that a rigid double envelope is provided, one envelope portion being between the spacers 4 and 5 which are far enough apart, so that this envelope is adapted to receive a document 6 to be processed, as, for instance, a check, and the other envelope being defined by the spacers 3 and 5 which are separated far enough to permit the entrance of a strip 7 of paper which may carry indicia pertaining to the document 6. The indicia may take the form of punchings in the paper strip 7 arranged in a predetermined coded manner. Coded punchings of this nature are well known in the art.

Figure 2:
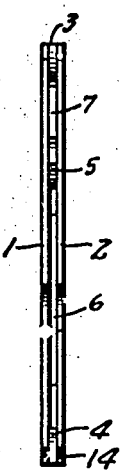
Fig. 2 is an end view of the carrier of Fig. 1.

The ends of the elongated spacers 3, 4 and 5 may be curved, as shown, to provide easy access for the document 6 and indicia strip 7 from either end of the carrier. A slot 8 at one end of the plate 1, parallel to the long side thereof, and a corresponding slot 9 at the opposite end of plate 2, parallel to the long side thereof, may be provided to facilitate removing the document 6 by hand. The slots 8 and 9 are wide enough to permit the finger to contact the document 6. Similarly, openings 10 and 11 may be provided in the plates 1 and 2 aligned with the paper strip 7 to facilitate removing said strip by hand, if necessary. Grooves 12 and 13 are also provided in opposite ends of the plates 1 and 2, which grooves may be used to facilitate positioning the carrier in the various machines through which it will pass while processing the document. The corners of the plates may also be cut away, as at 14, for a similar purpose. As will be seen in Fig. 2, the thickness of the spacers 3, 4 and 5 is substantially equal to the thickness of the document 6 and the indicia strip 7, thereby causing the inner walls of the plates 1, 2 to frictionally engage the document and indicia strip and preclude their accidental movement out of the envelope portions.

Figure 3:
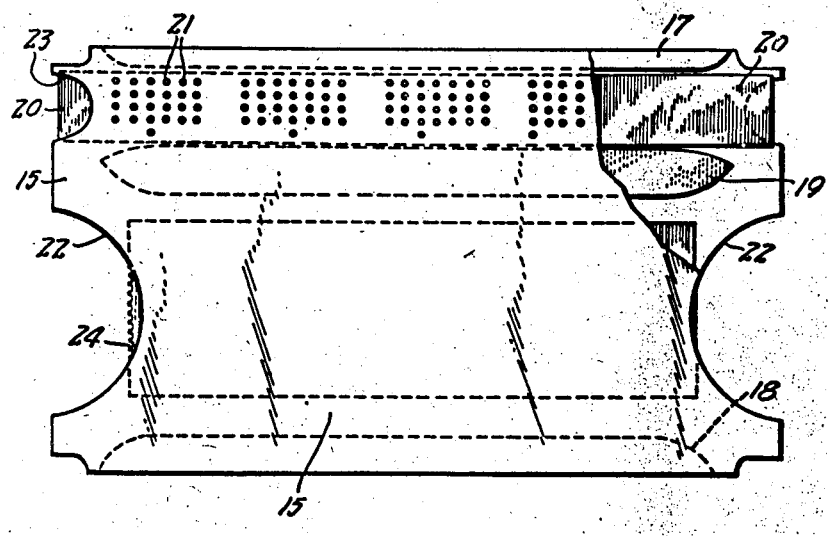
Fig. 3 is a front view of a modified form of carrier.
Figure 4:
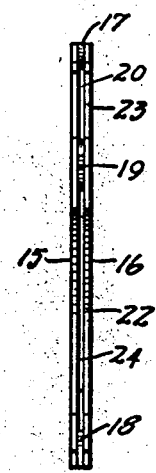
Fig. 4 is an end view of the carrier of Fig. 3.

Figures 3 and 4 show a modified form of the invention in which the plates 15 and 16 are secured together in the same manner as the carrier of Fig. 1 with spacers 17, 18 and 19 corresponding respectively to spacers 3, 4 and 5 of Fig. 1.

In this arrangement however, the paper strip 20 which is inserted between the spacers 17 and 19 is adapted to be punched with the necessary information after it is inserted in the carrier. To this end the plates 15 and 16 are provided with a complete set of holes extending through the two plates, so that punches may be inserted through these holes and through the paper which is held between the plates.

Cut-out portions 22 and 23 are also provided in both ends of each plate to facilitate insertion of the document 24 and paper strip 20 shown in the carrier.

Figure 5:
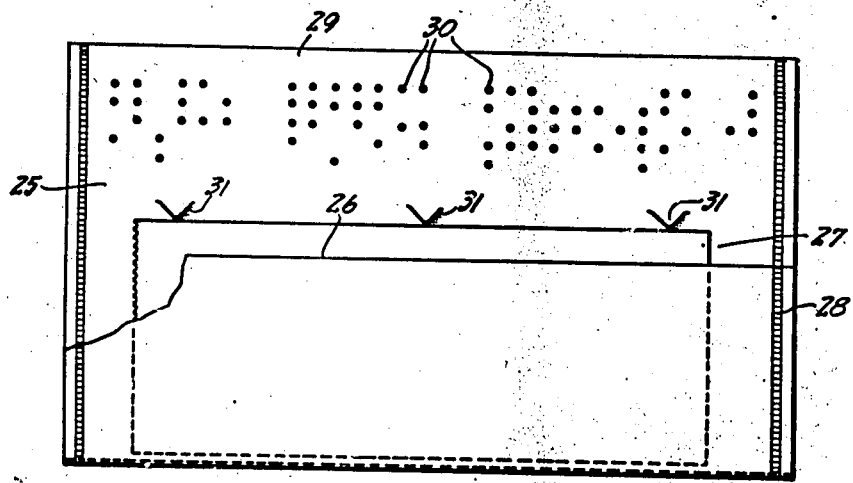
Fig. 5 is a front view of still another modified form of the carrier.

In Figure 5 another embodiment of the invention is shown. Here the carrier is made from a flat sheet 25 of material, such as paper, having one end 26 folded back upon itself to form a partial envelope to receive the document 27. The side edges of the folded portion 26 may be attached to the main portion of the sheet in any desired manner, such as, crimping the edges of the paper, as shown at 28, for completing the sides of the envelope.

The portion 29 above the document 27 may be punched, as indicated at 30, to provide indicia corresponding to the information contained on the document.

The sheet 25 may also be provided with struck-out portions 31 which are bent outwardly and help to keep the document in position in the envelope portion of the carrier.

Figure 6:
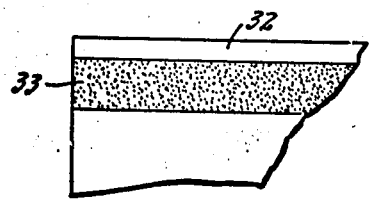
Fig. 6 is a fragmentary front view of a modified form of the carrier of Fig. 5.

In Figure 6 an arrangement is shown in which the sheet 32, which corresponds to the sheet 25 of Figure 5, has a coating 33 of magnetizable material, portions of which are magnetized to form the indicia.

Figure 7:
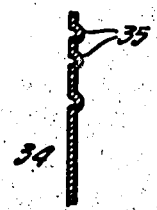
Fig. 7 is a sectional end view of a portion of another modified form of the carrier of Fig. 5.

Figure 7 shows a still further modification of the arrangement of Fig. 5 in which the sheet 34 is embossed, as at 35, to form the indicia.

By using the carrier of the invention, the handling of documents is greatly facilitated. Each document would have its own carrier and each carrier would be provided with the indicia corresponding to information contained on the document. The carriers can then be transported, sorted, and fed through processing machines which read the indicia from the carrier and make the necessary entries and other clerical or other procedures entirely automatically.

After the processing has been completed, the document may be removed from the carrier to be filed or returned to the owner in accordance with normal procedure. The carrier forms a protection for the document during the processing and permits complete processing without the necessity of marking the document in any way.

While I described above the principles of my invention in connection with specific apparatus, it is to be clearly understood that this description is made only by way of example and not as a limitation to the scope of my invention as set forth in the objects thereof and in the accompanying claims.

What is claimed is:

1. A carrier for transporting a document and a processing strip during automatic machine processing operations of the document in accordance with machine-control processing indicia on the processing strip, said carrier comprising a first and a second sheet of transparent material, spacing means positioned between said sheets and secured to each sheet to provide a unitary structure having a first compartment for receiving said document and a second compartment for receiving said processing strip.

2. A carrier as set forth in claim 1 wherein said spacing means are of a thickness substantially equal to the thickness of said document and said processing strip.

3. A carrier as set forth in claim 1 wherein said compartments have open opposite ends.

References Cited in the file of this patent

UNITED STATES PATENTS

| | | |
|---|---|---|
| 1,825,141 | Brand | Sept. 29, 1931 |
| 2,132,412 | Gollwitzer | Oct. 11, 1938 |
| 2,273,740 | Terry | Feb. 17, 1942 |
| 2,493,847 | Ayres | Jan. 10, 1950 |
| 2,537,732 | Angus | Jan. 9, 1951 |
| 2,650,024 | Ferrin | Aug. 25, 1953 |
| 2,673,033 | Gruver | Mar. 23, 1954 |
| 2,675,170 | Sebesta | Apr. 13, 1954 |
| 2,775,405 | Paston | Dec. 25, 1956 |